March 21, 1933. J. A. YUNKER 1,901,884
PROCESS FOR THE PRODUCTION OF HYDROGEN-NITROGEN GAS MIXTURES
Filed Aug. 13, 1927
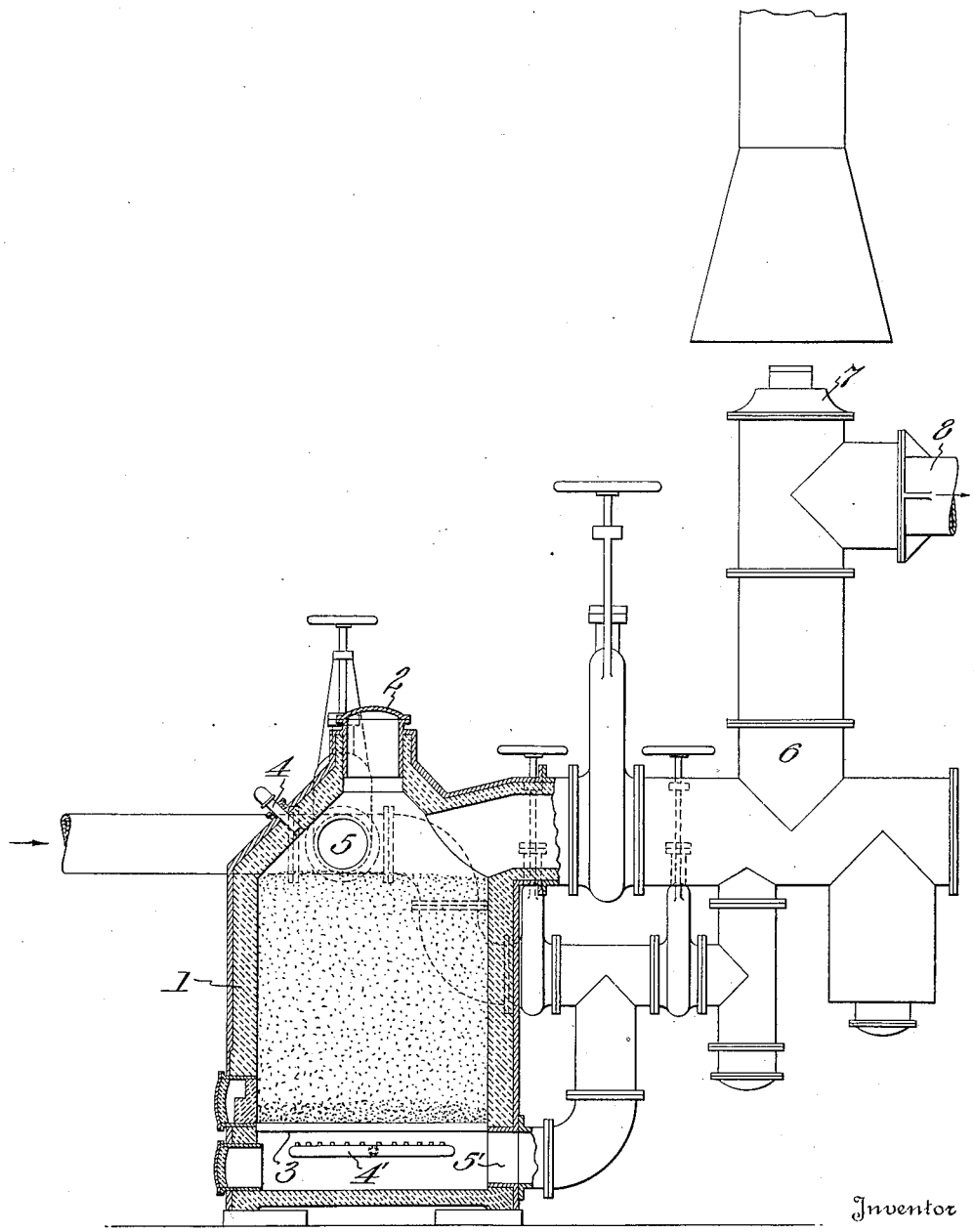
Inventor
James A. Yunker
By Byrnes Townsend & Breckenstein
his Attorney Patented Mar. 21, 1933

1,901,884

UNITED STATES PATENT OFFICE

JAMES A. YUNKER, OF LOUISVILLE, KENTUCKY, ASSIGNOR TO NATURAL GAS HYDROGEN CORPORATION, OF NEW YORK, N. Y., A CORPORATION OF DELAWARE

PROCESS FOR THE PRODUCTION OF HYDROGEN-NITROGEN GAS MIXTURES

Application filed August 13, 1927. Serial No. 212,774.

This invention relates to the production of hydrogen-nitrogen gas mixtures and more particularly to the production of a mixture of hydrogen and nitrogen suitable for use in ammonia synthesis. The process consists essentially in passing air or a similar oxygen-nitrogen mixture and natural gas or an analogous gas containing a high proportion of methane and/or other natural gas hydrocarbons including ethane, propane, butane and pentane, either separately or admixed in contact with highly heated coke.

It is well known that ammonia can be synthesized from a hydrogen-nitrogen mixture in the proportion of about 3 volumes of hydrogen to 1 volume of nitrogen and at the present time several methods for the production of such a hydrogen-nitrogen mixture are in use. It is also well known that a large proportion of the cost of synthesizing ammonia from a hydrogen-nitrogen mixture lies in the cost of producing the hydrogen-nitrogen mixture.

An object of the present invention is to produce a hydrogen-nitrogen mixture suitable for the synthesis of ammonia at a relatively low cost and thereby to correspondingly lower the cost of making ammonia. At the same time the present invention provides a new use for natural gas which increases the market for this gas and permits of its utilization for the production of a product which has a greater economic value than is realized by many forms of the present utilization of natural gas. In other words, the value of the natural gas resources of the country are materially increased.

The process preferably is carried out in a manner somewhat similar to that of the well-known so-called blue water gas process.

The accompanying drawing is a vertical section with parts in elevation illustrating one form of apparatus, i. e., a standard water-gas generator, suitable for carrying out the process.

Referring to the drawing, 1 is the firebrick lined, substantially cylindrical generator provided with the usual fuel charging door 2, grate bars 3, steam inlets 4 and 4', air inlets 5 and 5' (coming into gas outlet at back), hot gas conduit 6, waste gas outlet 7, and valuable gas conduit 8, with the necessary valves for making up- or down-runs as desired. In the operation of the water-gas set illustrated in accordance with the present invention the steam inlets 4 and 4' are used as gas inlets.

The process is carried out as follows:

After a fuel bed of burning coke has been built up in the generator 1 to the maximum height in the well-known manner the bed is blasted with air, introduced through 5 or 5', until the temperature within the bed is in excess of 1200° C., a temperature of about 1400° C. being preferred. A previously calculated part of the products of combustion after being freed from entrained carbon dust and cooled are passed to the storage through 6 and 8 and the remainder is passed through 7 to waste or for utilization of its heat content and recovery of entrained carbon dust. The air blast is then shut off and natural gas is introduced through 4 or 4' into the incandescent fuel bed where it is decomposed with the formation of hydrogen and oxids of carbon, principally the monoxid, and carbon dust. The issuing gases contain generally from 85% to 95% of hydrogen, and after being freed from carbon dust and cooled and admixed with the saved portion of the air blast gases give a gas mixture of approximately the following typical composition:

| | Per cent |
|---|---|
| Hydrogen | 69 |
| Nitrogen | 23 |
| Carbon monoxid | 3 |
| Carbon dioxid | 3 |
| Methane | 1.75 |
| Rare gases | .25 |

This gas mixture after the customary purification for the removal of the carbon oxids is suitable for use in ammonia synthesis.

The operation of the generator is subject to variation by so many conditions, such as atmospheric temperature and humidity, quality of fuel, thickness of fuel bed, diameter of generator, thermal efficiency of the generator, composition of methane-containing gas, water vapor content of gas, etc., that it is impossible to give a fixed formula for operation which will be most economical in all cases. In general the object sought for in the air blasting operation is to provide sufficient heat in the fuel bed to permit of the decomposition of the gas being treated at economic space velocities. It is, of course, well known that in a gas treating process a part of the cost of the operation consists of the fixed charges and maintenance costs of the apparatus used. Where the treatment is necessarily at a low space velocity the fixed charges and maintenance costs on the equipment make the cost of the gas product so high that the process cannot be used economically. In accordance with the present invention space velocities are attained which result in such low fixed and maintenance cost per unit of gas made that the hydrogen-nitrogen mixture can be produced at a substantially lower cost than by any known process of which I am aware.

The high space velocities are attained in accordance with my invention by comprehensive utilization of the facilities of the apparatus for maintaining the desired conditions in the fuel bed, i. e., by manipulation of the up- and down-runs of both air and gas, etc., and by the use of coke or other similar form of carbon as a catalyst for hastening the decomposition of the hydrocarbons and also as a means for providing the necessary heat.

For the purpose of illustration the following conditions of typical runs are given:

Using a generator of 7 feet inside diameter containing a fuel bed 9 feet high, natural gas was decomposed at the rate of 30,000 cubic feet per hour. This gave about 80,000 cubic feet of hydrogen-nitrogen gas mixture of approximately the composition given above and at this space velocity the fixed charges and maintenance costs on the equipment used were less than three cents per 1000 cubic feet of gas produced. In this operation, starting with a fuel bed at about 1200° C., air at atmospheric temperature was blown into the generator at the rate of 5,000 cubic feet per minute for 3 minutes. For about 45 seconds of this 3-minute period the products of combustion were run into storage and for the remaining time the products of combustion were run to waste. The temperature of the fuel bed at the end of this blasting period was about 1400° C. The air supply was then shut off and natural gas of about the following composition:

| | Per cent |
|---|---|
| Methane | 78 |
| Ethane and higher hydrocarbons | 20 |
| Nitrogen | 1 |
| Carbon dioxid | 1 | was introduced into the generator at the rate of 750 cubic feet per minute for about 7 minutes, the products being run into storage. The cycle described requires a little more than 10 minutes (due to the time required for the manipulation of valves) and is repeated continuously with variations as required due to the condition of the fuel bed from clinker formation, incipient blow holes, etc., and with the necessary interruptions for charging new fuel and removal of clinker. Fuel was added in batches of about 1200 pounds every 4 hours and clinker was removed once each 24 hours. In the operation described above a down-run on gas was made every third run. It will, of course, be understood that the above described detailed operation is only typical and is subject to variation depending upon the operating conditions referred to above.

In a modification of the foregoing typical procedure two generators were operated in series, the air and gas passing through the fuel beds in both generators, either up through both or down through both, or up through the first and down through the second or vice versa, depending upon the condition of the fuel beds, it being understood that manipulations of the direction of the gas flow through the fuel beds are made for the purpose of maintaining uniformity of temperature in the fuel beds. The use of two generators in series has the advantage over the use of a single generator that the hydrocarbon content of the gas is practically completely cracked leaving only a trace, calculated as methane, as compared with 1.75% of methane, which represents the average, when one generator is used and the process is carried out at economic space velocities.

The consumption of fuel (coke) per 1000 cubic feet of hydrogen-nitrogen gas mixture produced is about 6 pounds.

As appears from the foregoing, the preferred range of temperature in the operation is from 1200° C., the lowest temperature at which methane can be substantially completely cracked at economic space velocity, to 1400° C., the maximum temperature found to be suitable for smooth operation with the present day available designs of apparatus and the rates and periods of gas and air supplies are regulated accordingly. It is apparent, however, that a higher maximum temperature, say 1500° C., or a smaller range, for example 1250° C. to 1350° C., might be used without departure from my invention.

In the described procedure the air and gas are supplied to the fuel bed separately, the latter portion of the gaseous products of the air blasting being wasted while the first of the gaseous products of the air blasting and all the products of the gas decompositions are mixed to produce the desired hydrogen-nitrogen mixture. A substantially equivalent operation is to introduce the gas simultaneously with that portion of air, the gaseous products of which are to be saved. In carrying out this combined operation ordinarily it will be necessary to reduce the rate of supply of the gas and air to correspond with the permissible space velocities of the generator.

An example of this type of operation is as follows:

Air was introduced into the above described 7 foot (inside diameter) generator, using a 9 foot fuel bed, at the rate of 5000 cubic feet per minute for 2¼ minutes, the resulting gases being wasted. The air supply was then turned off and natural gas, of the composition set out above, was introduced into the generator at the rate of 750 cubic feet per minute for about 5 minutes, the resulting gases passing to storage. Air was then turned on again and a mixture of 1750 cubic feet of air to 750 cubic feet of natural gas was introduced into the generator for 2 minutes at the rate of about 2500 cubic feet per minute, the resulting gases passing to storage. This cycle resulted in the production of about 14,000 cubic feet of gas mixture of approximately the composition set out hereinbefore.

I claim:

1. Process for the production of hydrogen-nitrogen gas mixtures which comprises contacting a natural gas hydrocarbon and an oxygen-nitrogen mixture with coke heated to a temperature of at least 1200° C. and mixing the resulting gases.

2. Process for the production of hydrogen-nitrogen gas mixtures which comprises contacting natural gas and air with coke heated to a temperature of at least 1200° C. and mixing the resulting gases.

3. Process for the production of hydrogen-nitrogen gas mixtures which comprises contacting natural gas and air simultaneously with coke heated to a temperature of at least 1200° C. and collecting the resulting gases.

4. Process for the production of hydrogen-nitrogen gas mixtures which comprises heating coke to a temperature of at least 1200° C., blasting the coke with air for a time sufficient to increase the temperature of the coke about 200° C., blasting the coke with natural gas while at said increased temperature and mixing the gaseous products of the natural gas blasting with a portion of the gaseous products of the air blasting to produce a gas mixture containing hydrogen and nitrogen in suitable proportions for ammonia synthesis.

5. Process for the production of hydrogen-nitrogen gas mixtures which comprises blasting incandescent coke with air to raise its temperature above 1200° C., contacting natural gas with the coke while at said temperature above 1200° C. whereby the temperature of the coke is reduced to about 1200° C. and continuously repeating said cycle of operations, saving and mixing the gaseous products derived from the natural gas and at least a part of the gaseous products derived from the air at each cycle.

In testimony whereof, I affix my signature.

JAMES A. YUNKER.